W. N. BOOTH.
VEHICLE WHEEL AND METHOD OF FORMING THE SAME.
APPLICATION FILED JUNE 29, 1917.

1,334,013.

Patented Mar. 16, 1920.
2 SHEETS—SHEET 1.

Inventor
William N Booth

By Whittemore Hulbert + Whittemore
Attorneys

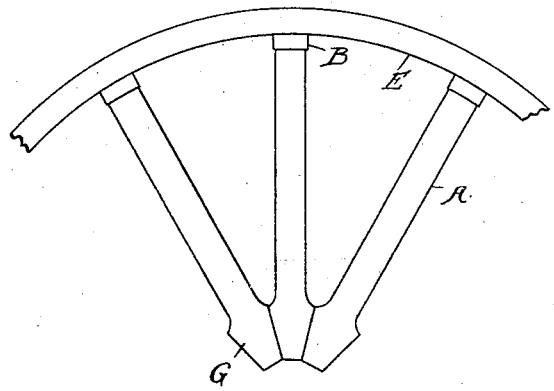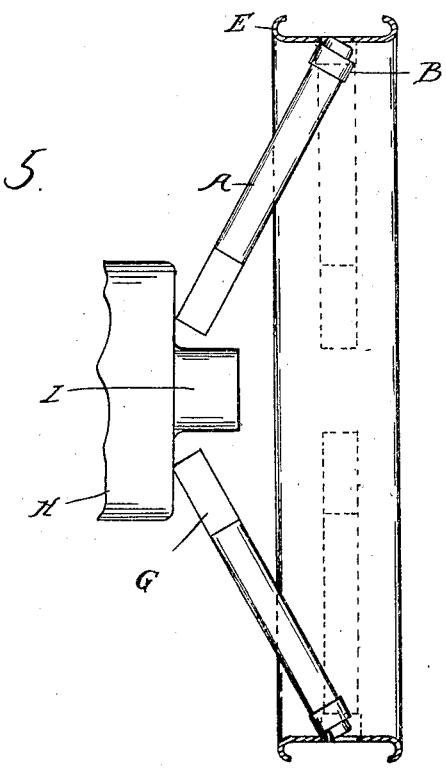

UNITED STATES PATENT OFFICE.

WILLIAM N. BOOTH, OF DETROIT, MICHIGAN.

VEHICLE-WHEEL AND METHOD OF FORMING THE SAME.

1,334,013.  Specification of Letters Patent.  Patented Mar. 16, 1920.

Application filed June 29, 1917. Serial No. 177,688.

*To all whom it may concern:*

Be it known that I, WILLIAM N. BOOTH, a citizen of the United States of America, residing at Detroit, in the county of Wayne and State of Michigan, have invented certain new and useful Improvements in Vehicle-Wheels and Methods of Forming the Same, of which the following is a specification, reference being had therein to the accompanying drawings.

The invention relates to vehicle wheels of the type having wooden spokes and designed for use in connection with pneumatic tires. It is usual in this type of wheel to assemble the spokes with wooden felly sections and to then press the assembly into a metallic tire or rim for either directly engaging the tire or for the engagement of a demountable tire-supporting rim. It is the object of the present invention to dispense with the wooden felly and to simplify the operation of assembling the wheel. It is a further object to obtain an engagement between the spokes and the metallic rim which, while permitting of easy engagement and assembly, will nevertheless securely fasten the spoke from accidental disengagement and prevent any upsetting thereof.

In the drawings:

Fig. 4 is an elevation showing a plurality of the spokes and the manner of assembling the same;

Fig. 5 is a cross section showing the manner of engaging the spokes with the rim.

Figure 1:
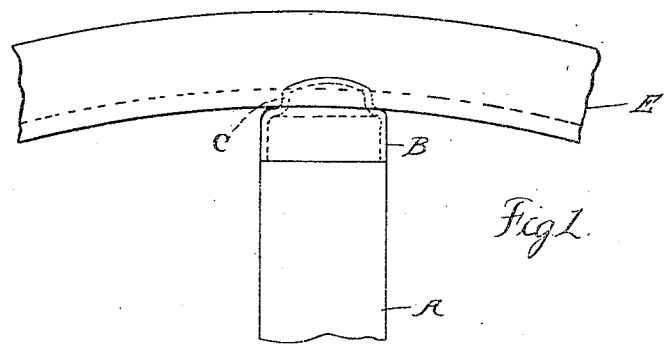
Figure 1 is a side elevation showing the outer portion of a spoke and the engagement of the same with the rim.
Figure 2:
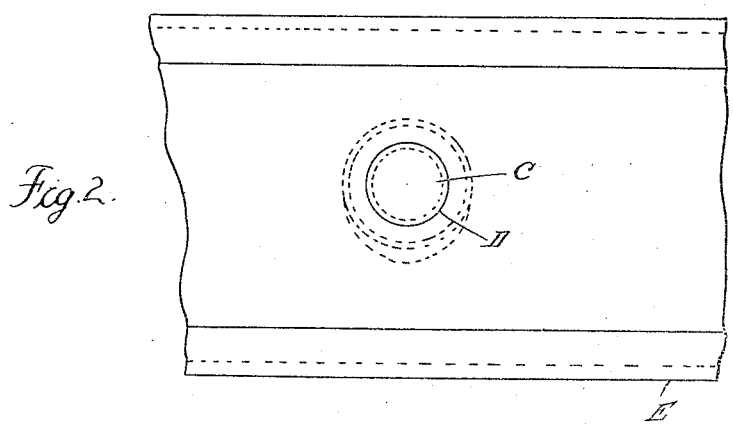
Fig. 2 is a plan view thereof.
Figure 3:
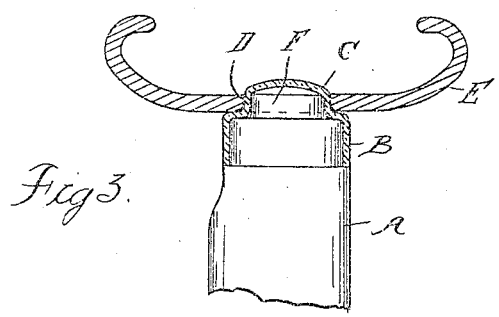
Fig. 3 is a cross section.

In the usual type of wheel having a wooden felly the end portion of the spoke is reduced in size to form a tenon for engaging the felly. With my present construction in place of this tenon the spoke is extended to fit against the metallic rim and a metallic ferrule is provided for surrounding the end portion to prevent any uprounding of the same by the impact of the rim. This ferrule is also provided with means for interlocking with the rim. As shown in Figs. 1 to 3, A is the spoke, B is a metallic ferrule formed of a cup-shaped member and C is a portion of the cup of reduced diameter forming a pin or tenon for engaging an aperture or recess D in the metallic rim E. In the manufacture of these parts the rim E is punched to form the apertures D in their proper locations and the spoke A is turned to fit into the ferrule B and to also have a portion F of reduced diameter which fits into the cupped tenon C. As shown the outer surface of the ferrule is flush with the spoke, but this is not essential. The spokes are formed with the usual wedge-shaped inner end portions G which fit against and react upon each other to resist the radial thrust on the spoke. As it is essential that the spokes should bear firmly against the rim they are formed of such a length as to be placed under slight compression when assembled. The method of assembling is then to arrange the spokes obliquely in relation to the plane of rotation of the wheel with their wedge-shaped inner ends G in contact with each other. Pressure is then applied to force the inner ends of the spokes into the plane of the wheel, which, as indicated in Fig. 5, may be accomplished by a member H having a portion I for bearing against the inner ends of the spokes and forcing them radially outward.

With my improved construction the rim E will perform the function of the felly and the cup-shaped ferrule will maintain a firm engagement between the spokes and the rim. Furthermore, the ferrule prevents any upsetting of the fibers of the wood so that the full length of the spoke is maintained. By forming the ferrule and tenon of a cupped member the latter constitutes a cap for the end of the spoke which excludes moisture from the end fibers of the wood.

Furthermore, as clearly shown in Figs. 1 to 3, the caps are formed from pressed sheet metal which, being die-fashioned, is exactly predetermined in size. This insures a firm mechanical engagement of the tenons with the spoke-engaging seats and also a firm engagement with the end portion of the spoke. Thus the spokes are interchangeable and the cap of each would fit any one of the spoke-engaging seats without the necessity of any machining or fitting operation.

What I claim as my invention is:

1. In a vehicle wheel, the combination of a continuous metallic rim, a series of wooden spokes having their inner ends in abutting engagement with each other, and metallic caps fixedly secured to the outer ends of said spokes having a substantial interlocking engagement with an integral portion of said metallic rim.

2. In a vehicle wheel, the combination of a continuous metallic rim, a series of wooden spokes having their inner ends in abutting engagement with each other, and metallic caps fixedly secured to said spokes surrounding and forming ferrules for the outer end portions thereof and provided with a substantial interlocking engagement with an integral portion of the rim.

3. In a vehicle wheel, the combination of a continuous metallic rim, a series of wooden spokes having their inner ends in abutting engagement with each other, and metallic caps fixedly secured to said spokes surrounding and forming ferrules for the outer end portions thereof and provided with tenon portions having a substantial engagement with an integral portion of said rim.

4. In a vehicle wheel, the combination of a metallic rim, a series of wooden spokes having their inner ends in abutting engagement with each other, and die-fashioned metallic caps for the outer ends of said spokes comprising ferrule portions surrounding the spoke and a tenon portion having a substantial interlocking engagement with an integral portion of said felly.

5. In a vehicle wheel, the combination of a metallic rim, a wooden spoke, a metallic cap for the spoke having a ferrule portion surrounding the same, a portion abutting against the end fibers of the wood, and a portion seated in the rim engageable with its seat by a slight angular movement of the spoke.

6. In a vehicle wheel, the combination of a continuous metallic rim having spoke-engaging seats formed therein, a series of wooden spokes having their inner ends in abutting engagement with each other, and die-fashioned metallic caps for the outer ends of said spokes having a portion fitting the spoke and a portion engageable with and fitting said seat, said last-mentioned portion engageable with said seat by an angular movement of the spoke.

7. In a vehicle wheel, the combination of a continuous metallic rim having spoke-engaging recesses formed therein, a series of wooden spokes having their inner ends in abutting engagement with each other, and die-fashioned metallic caps for said spokes having portions closely fitting and forming ferrules for the outer ends of the spokes and tenon portions for fitting and engageable with said seats when the inner ends of the spokes are in abutting engagement.

8. In a vehicle wheel, the combination of a continuous metallic rim having spoke-engaging recesses therein, a series of wooden spokes having their inner ends in abutting engagement with each other, and metallic caps for said spokes comprising die-fashioned sheet metal members, a portion thereof surrounding and forming a ferrule for the outer end portion of the spoke, another portion abutting against the end of the spoke, and a third portion forming a tenon for fitting and engageable with said recess in the rim when said spokes are in abutting engagement.

9. The method of assembling spoked wheels, comprising forming a continuous metallic rim with spoke-engaging seats, engaging metallic caps with the outer ends of the spokes, placing the capped spokes in angular relation to the plane of the wheel with their inner ends bearing against each other and their capped ends in registration with said seats, and pressing the inner ends of the spokes laterally into the plane of the wheel whereby their outer ends are forced radially into said spoke-engaging seats.

In testimony whereof I affix my signature.

WILLIAM N. BOOTH.